US011403925B2

(12) United States Patent
Kraft et al.

(10) Patent No.: US 11,403,925 B2
(45) Date of Patent: Aug. 2, 2022

(54) SYSTEMS AND METHODS FOR BROADCASTING AN AUDIO OR VISUAL ALERT THAT INCLUDES A DESCRIPTION OF FEATURES OF AN AMBIENT OBJECT EXTRACTED FROM AN IMAGE CAPTURED BY A CAMERA OF A DOORBELL DEVICE

(71) Applicant: Ademco Inc., Golden Valley, MN (US)

(72) Inventors: Nathaniel Kraft, Minnetonka, MN (US); Piotr Romanczyk, Melville, NY (US); William R. Blum, Huntington Station, NY (US)

(73) Assignee: Ademco Inc., Golden Valley, MN (US)

(*) Notice: Subject to any disclaimer, the term of this patent is extended or adjusted under 35 U.S.C. 154(b) by 0 days.

(21) Appl. No.: 16/860,244

(22) Filed: Apr. 28, 2020

(65) Prior Publication Data

US 2021/0335110 A1 Oct. 28, 2021

(51) Int. Cl.

| | |
|---|---|
| ***G08B 13/196*** | (2006.01) |
| ***G08B 3/10*** | (2006.01) |
| ***G08B 5/36*** | (2006.01) |
| ***H04N 7/18*** | (2006.01) |
| ***G06V 20/52*** | (2022.01) |

(52) U.S. Cl.

CPC ....... *G08B 13/19613* (2013.01); *G06V 20/52* (2022.01); *G08B 3/10* (2013.01); *G08B 5/36* (2013.01); *G08B 13/19652* (2013.01); *G08B 13/19684* (2013.01); *H04N 7/186* (2013.01)

(58) Field of Classification Search

None

See application file for complete search history.

(56) References Cited

U.S. PATENT DOCUMENTS 6,041,361 A * 3/2000 Wilson ............. G08B 13/19645 348/E7.086
6,195,680 B1 2/2001 Goldszmidt et al.
6,476,858 B1 * 11/2002 Ramirez Diaz .... G08B 13/1961 348/E7.086
7,467,400 B1 * 12/2008 Moss ...................... G07C 9/38 713/150

(Continued)

FOREIGN PATENT DOCUMENTS

WO 2019060066 A1 3/2019

OTHER PUBLICATIONS

International Search Report and Written Opinion of the International Application No. PCT/US2021/029382, dated Aug. 11, 2021, 15 pg.

*Primary Examiner* — Ricky Chin
(74) *Attorney, Agent, or Firm* — Fredrikson & Byron, P.A.

(57) ABSTRACT

Systems and methods for broadcasting an audio or visual alert that includes a description of features of an ambient object extracted from an image captured by a camera of a doorbell device are provided. Such systems and methods can include the camera capturing the image when the ambient object is within a field of view of the camera and a processor receiving the image from the camera, processing the image with an artificial intelligence model to identify and extract details of the features of the ambient object, and initiating a broadcast of the audio or visual alert by an alert device associated with the camera, wherein the audio or visual alert can include the description of the features of the ambient object.

19 Claims, 2 Drawing Sheets

(56) References Cited

U.S. PATENT DOCUMENTS 7,921,150 B1 4/2011 Schwartz
8,544,061 B2 9/2013 Chen
8,565,228 B1 10/2013 Howard
8,780,201 B1* 7/2014 Scalisi .................. H04N 7/186 348/143
8,949,892 B2 2/2015 Kiok et al.
9,350,942 B2 5/2016 Zino et al.
9,549,152 B1 1/2017 Nayyar et al.
10,133,935 B2 11/2018 Child et al.
10,491,723 B2 11/2019 Shen et al.
2007/0186003 A1 8/2007 Foster et al.
2012/0272293 A1 10/2012 Jankowski et al.
2013/0070928 A1* 3/2013 Ellis ....................... H04R 25/30 381/56
2014/0266669 A1* 9/2014 Fadell ..................... G06N 5/04 340/501
2015/0341603 A1* 11/2015 Kasmir .................... H04N 5/33 348/143
2016/0306535 A1* 10/2016 Krishnamoorthy .......................... G06F 3/04847
2016/0379471 A1* 12/2016 Eyring .................. G08B 25/08 340/506
2017/0195640 A1* 7/2017 Pasternak ............... H04W 4/12
2018/0075681 A1* 3/2018 Scalisi ............... G06K 9/00771
2018/0191930 A1* 7/2018 Jeong ..................... H05K 1/144
2018/0247504 A1* 8/2018 Siminoff .......... G08B 13/19608
2018/0270763 A1* 9/2018 Lee ........................ H04N 7/181
2018/0307903 A1 10/2018 Siminoff
2018/0350213 A1* 12/2018 Bart ....................... G08B 13/19
2019/0066470 A1* 2/2019 Jeon ....................... H04N 7/186
2019/0068881 A1* 2/2019 Kim ................. H04N 5/232411
2019/0090014 A1* 3/2019 Shoop ................ H04N 21/4126
2019/0327448 A1* 10/2019 Fu ........................... G08B 3/10
2020/0089965 A1 3/2020 Hollander et al.
2020/0202293 A1* 6/2020 Newell .............. G06Q 10/0832
2020/0211546 A1* 7/2020 Schairer .................. H04W 4/70
2020/0320837 A1* 10/2020 Lemberger ....... G08B 13/19695
2020/0402374 A1* 12/2020 Child ....................... G08B 7/06
2021/0029298 A1* 1/2021 Mysore ............ G08B 13/19669
2021/0142055 A1* 5/2021 Broggi ..................... G08G 1/01
2021/0144341 A1 5/2021 Karadzic
2021/0200853 A1* 7/2021 Lagnado ............. H04L 63/0853

* cited by examiner

SYSTEMS AND METHODS FOR BROADCASTING AN AUDIO OR VISUAL ALERT THAT INCLUDES A DESCRIPTION OF FEATURES OF AN AMBIENT OBJECT EXTRACTED FROM AN IMAGE CAPTURED BY A CAMERA OF A DOORBELL DEVICE

FIELD

The present invention relates generally to doorbell devices. More particularly, the present invention relates to systems and methods for broadcasting an audio or visual alert that includes a description of features of an ambient object extracted from an image captured by a camera of a doorbell device.

BACKGROUND

A known doorbell device can initiate a broadcast of a customized audio alert that is pre-generated and associated with a known person or object in response to identifying the known person or object in an image captured by a camera of such a doorbell device. However, known doorbell devices do not generate customized and detailed audio and/or visual alerts for unknown persons or objects.

In view of the above, there is a need and an opportunity for improved systems and methods.

DETAILED DESCRIPTION

Figure 1:
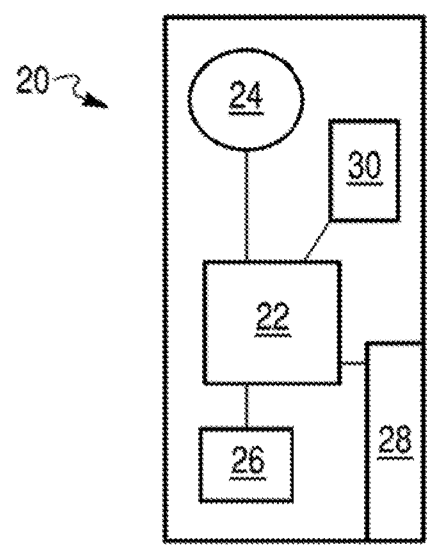
FIG. 1 is a block diagram of a doorbell device in accordance with disclosed embodiments.

While this invention is susceptible of an embodiment in many different forms, specific embodiments thereof will be described herein in detail with the understanding that the present disclosure is to be considered as an exemplification of the principles of the invention. It is not intended to limit the invention to the specific illustrated embodiments.

Embodiments of the claimed invention can include systems and methods for broadcasting an audio or visual alert that includes a description of features of an ambient object extracted from an image captured by a camera of a doorbell device. In some embodiments, the doorbell device can include the camera and a processor, and in some embodiments, the processor can (1) receive the image from the camera, (2) process the image with an artificial intelligence model to identify and extract details of the features of the ambient object, and (3) initiate a broadcast of the audio or visual alert by an alert device associated with the camera.

In some embodiments, the audio or visual alert can include the description of the features of the ambient object. For example, in some embodiments, the processor can use the artificial intelligence model to extract the details of a person depicted in the image, such as a height of the person, an eye color of the person, a description of the person's clothing, a physical build of the person, any textual indicators on the person or the person's clothing, and other features as would be understood by a person of ordinary skill in the art. Additionally or alternatively, in some embodiments, the processor can use the artificial intelligence model to extract the details of an inanimate or animate object, other than people, depicted in the image. For example, when the object is a vehicle, the details extracted from the image can include a license plate of the vehicle, a make of the vehicle, a model of the vehicle, and other features as would be understood by a person of ordinary skill in the art.

In some embodiments, the processor can process the image to determine whether the ambient object is a known object or a generic object, and when the ambient object is the known object, the audio or visual alert can include a sound and/or a visual indicator associated with the known object and, accordingly, fail to include the description of the features of the ambient object. Additionally, in some embodiments, when the processor fails to identify the ambient object as the known object, the processor can classify the ambient object as the generic object.

In some embodiments, the alert device can include an audio device within a region outside of which the doorbell device is located, and in these embodiments, the alert device can communicate with a transceiver of the doorbell device via a wireless network or a hardwired connection. Additionally or alternatively, in some embodiments, the alert device can be part of, housed in, and/or integral with the doorbell device and communicate with the processor directly. Additionally or alternatively, in some embodiments, the alert device can include a mobile device of an authorized user of the region outside of which the doorbell device is located, and in these embodiments, the alert device can communicate with the transceiver of the doorbell device via the wireless network.

In some embodiments, the camera can capture the image when the camera is activated and the ambient object is located within a field of view of the camera. In these embodiments, a proximity detector can activate the camera when the ambient object is detected within a detection range of the proximity detector. For example, in some embodiments the proximity detector can be part of, included in, and/or integral with the doorbell device and communicate with the camera and/or the processor directly. Additionally or alternatively, in some embodiments, the proximity detector can communicate with the transceiver of the doorbell device via the wireless network or the hardwired connection.

In some embodiments, a cloud server that is remote from the doorbell device and the region outside of which the doorbell device is located can execute one or more of steps that would otherwise be executed by the processor as described above. For example, in some embodiments, the cloud server can receive the image from the camera and process the image with the artificial intelligence model to identify and extract the details of the features of the ambient object. Additionally or alternatively, in some embodiments, the cloud server can initiate the broadcast of the audio or visual alert. Additionally or alternatively, in some embodiments, the cloud server can process the image to determine whether the ambient object is the known object or the generic object, and in these embodiments, when the cloud server fails to identify the ambient object as the known object, the cloud server can classify the ambient object as the generic object.

Figure 2:
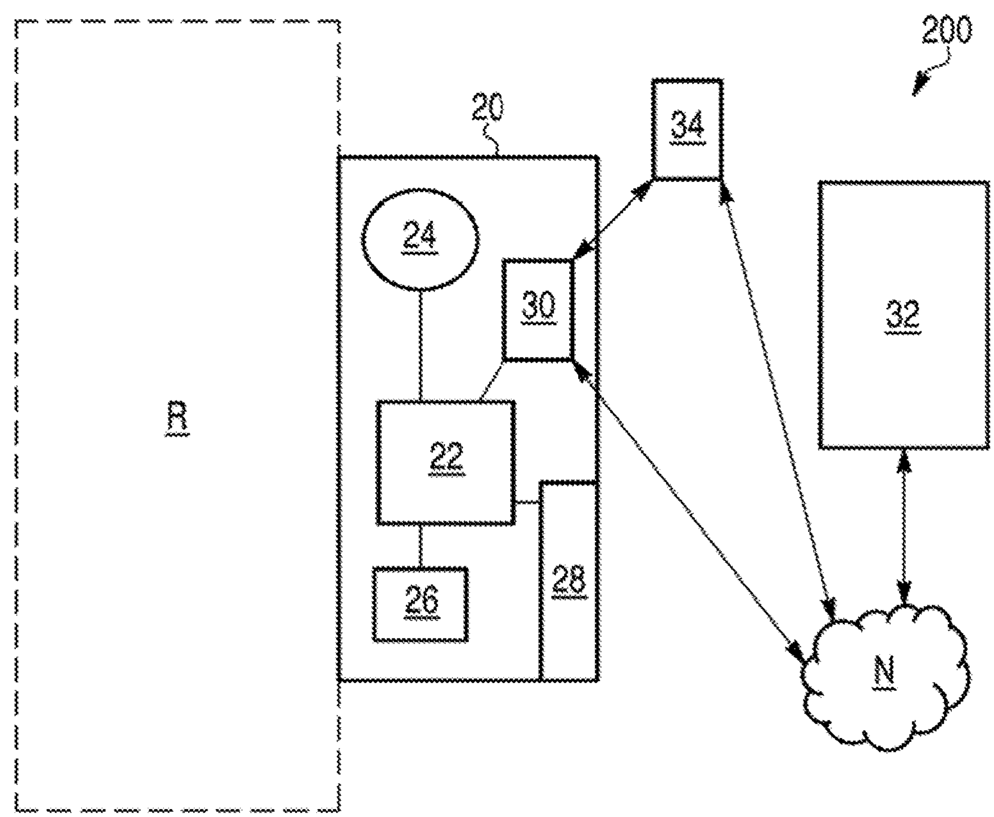
FIG. 2 is a block diagram of a system in accordance with disclosed embodiments.

FIG. 1 is a block diagram of a doorbell device 20 in accordance with disclosed embodiments, and FIG. 2 is a block diagram of a system 200 in accordance with disclosed embodiments. As seen in FIG. 1, in some embodiments, the doorbell device 20 can include a processor 22, a camera 24, and in some embodiments, a proximity detector 26, an alert device 28, and/or a transceiver 30. As seen in, FIG. 2, in some embodiments, the system 200 can include the doorbell device 20 and a cloud server 32 such that the doorbell device 20 can be located outside of a region R, such that the transceiver 30 can communicate with the cloud server 32 via a network N, and in some embodiments, such that the transceiver 30 can communicate with an alert device 34, for example, when the alert device 34 is separate from the doorbell device 20 and/or includes a mobile device of an authorized user of the region R.

Figure 3:
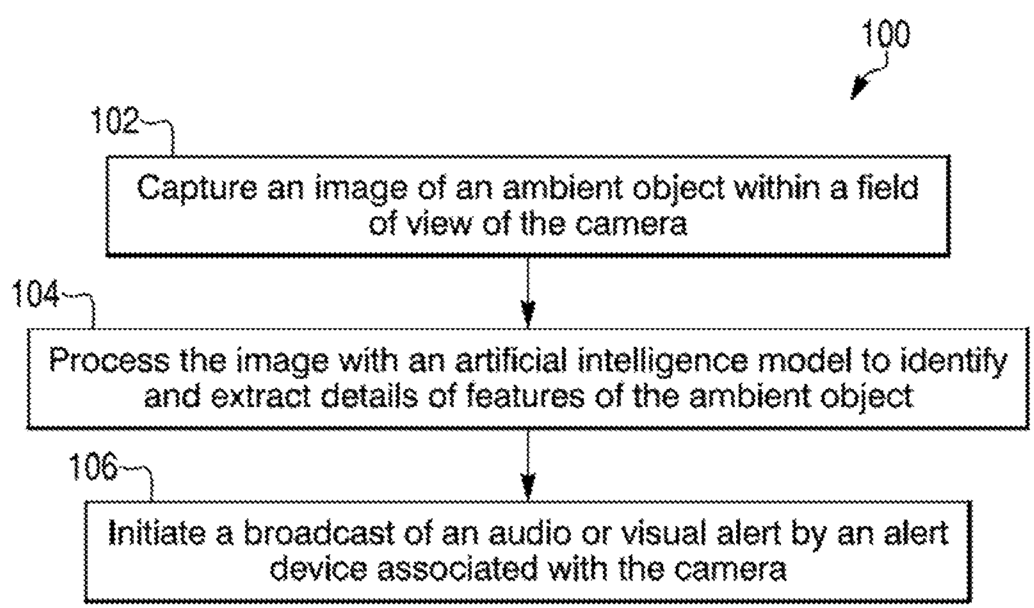
FIG. 3 is a flow diagram of a method in accordance with disclosed embodiments.

FIG. 3 is a flow diagram of a method 100 in accordance with disclosed embodiments. As seen in FIG. 3, when the camera 24 is activated, for example, by the proximity detector 26, the method 100 can include the camera 24 capturing an image of an ambient object within a field of view of the camera 24, as in 102. Then, the method 100 can include the processor 22 and/or the cloud server 32 processing the image with an artificial intelligence model to identify and extract details of features of the ambient object, as in 104, and initiating a broadcast of an audio or visual alert by the alert device 28 or 34, as in 106.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A doorbell device comprising:

a camera that, when activated, captures an image of a person within a field of view of the camera; and a processor that (1) receives the image from the camera, (2) processes the image with an artificial intelligence model to identify and extract details of one or more visual features of the person, and (3) initiate a broadcast of an audio alert by an alert device associated with the camera, wherein the audio alert includes an audio recitation of the details of the one or more visual features of the person.

2. The doorbell device of claim 1 wherein the alert device includes an audio device within a region outside of which the doorbell device is located.

3. The doorbell device of claim 1 wherein the alert device includes a mobile device of an authorized user of a region outside of which the doorbell device is located.

4. The doorbell device of claim 1 further comprising:

a proximity detector that activates the camera when the person is detected within a detection range of the proximity detector.

5. The doorbell device of claim 1 wherein the processor processes the image to determine whether the person is a known object or a generic object, and wherein the processor initiates the audio or visual alert in response to classifying the person as the generic object.

6. The doorbell device of claim 1, wherein the one or more visual features of the person comprise one or more of:

a height of the person, an eye color of the person, a description of clothing worn by the person, a physical build of the person, or one or more textual indicators on the person or clothing worn by the person.

7. The doorbell device of claim 1, further comprising a transceiver, wherein the processor initiates the broadcast of the audio alert by the transceiver and to, and for output by, the alert device associated with the camera.

8. A system comprising:

a doorbell device;

a camera of the doorbell device that, when activated, captures an image of a person within a field of view of the camera; and a cloud server remote from the doorbell device that (1) receives the image from the camera, (2) processes the image with an artificial intelligence model to identify and extract details of one or more visual features of the person, and (3) initiates a broadcast of an audio alert by an alert device associated with the camera, wherein the audio alert includes an audio recitation of the details of the one or more visual features of the person.

9. The system of claim 8 wherein the alert device includes an audio device within a region outside of which the doorbell device is located.

10. The system of claim 8 wherein the alert device includes a mobile device of an authorized user of a region outside of which the doorbell device is located.

11. The system of claim 8 further comprising:

a proximity detector that activates the camera when the person is detected within a detection range of the proximity detector.

12. The system of claim 8 wherein the cloud server processes the image to determine whether the person is a known object or a generic object, and wherein the cloud server initiates the audio or visual alert in response to classifying the person as the generic object.

13. A method comprising:

when a camera of a doorbell device is activated, capturing an image of a person within a field of view of the camera;

processing the image with an artificial intelligence model to identify and extract details of one or more visual features of the person; and initiating a broadcast of an audio alert by an alert device associated with the camera, wherein the audio alert includes an audio recitation of the details of the one or more visual features of the person.

14. The method of claim 13 wherein the alert device includes an audio device within a region outside of which the doorbell device is located.

15. The method of claim 13 wherein the alert device includes a mobile device of an authorized user of a region outside of which the doorbell device is located.

16. The method of claim 13 further comprising:

activating the camera when the person is detected within a detection range of a proximity detector.

17. The method of claim 13 further comprising:

determining whether the person is a known object or a generic object; and in response to determining that the person is the generic object, initiating the broadcast of the audio or visual alert.

18. The method of claim 13 further comprising:

processing the image with the artificial intelligence model at the doorbell device.

19. The method of claim 13 further comprising:

processing the image with the artificial intelligence model at a cloud server that is remote from the doorbell device.

* * * * *